Patented Nov. 29, 1938

2,138,081

UNITED STATES PATENT OFFICE 2,138,081

PROCESS FOR THE PRODUCTION OF SPONGE RUBBER FROM AQUEOUS RUBBER DISPERSIONS

Hans Wolf, Frankfort-on-the-Main, Germany, assignor to American Lurgi Corporation, New York, N. Y., a corporation of New York No Drawing. Application May 10, 1935, Serial No. 20,893. In Germany May 17, 1934

6 Claims. (Cl. 18—53)

This invention relates to a process for the production of sponge rubber from aqueous rubber dispersions.

A number of processes for the production of sponge rubber from aqueous dispersions of rubber have already been proposed. For example, rubber latex has been treated with soluble carbonates, from which latter $CO_2$ is liberated by the addition of acid, with simultaneous coagulation of the rubber, the resulting vesicular mass being vulcanized. According to another process, aqueous dispersions of rubber have been fixed with organic bases and finely powdered solid ammonium carbonate, the mixture being then warmed until the ammonium salt has dissociated and the rubber dispersion coagulated. A number of processes are based on the fundamental idea of transforming aqueous dispersions of rubber—containing suitable additions, if desired—into foam, for example, by "whipping", said foam being then solidified and (if desired) vulcanized. According to another process, the aqueous rubber dispersions are treated with moderate amounts of a rubber solvent, the mass being then caused to solidify, and vulcanized. A number of processes are known for producing extremely microporous sponge rubber, in which the rubber dispersion is transformed into an aqueous jelly, which is then vulcanized under conditions preventing the escape of water. Finally, aggregations of granules of a material that disintegrates on contact with water, have been suffused with heat-sensitive rubber dispersions, the latter being then caused to solidify and the granules afterwards removed from the rubber system by treatment with water.

The present invention is based on the principle of treating aqueous dispersions of rubber with substances such as hydrogen peroxide, or peroxides such as sodium peroxide and potassium peroxide, or per-salts such as sodium perborate, which liberate oxygen on contact with, or being warmed with, the rubber dispersions, then allowing, or causing, the liberation of oxygen to proceed in the dispersions so prepared, so that the dispersion becomes filled with gas bubbles, and solidifying the resulting foam, if desired, after moulding same.

The present process can be facilitated by the addition of catalysts—such as salts of iron, or haemoglobin—which favour the splitting off of oxygen.

It is preferable to perform the process with rubber dispersions that contain, in addition to the oxygen-liberating substances, additions which impart to the dispersions the property of solidifying to jelly, on being warmed or merely left to stand. Such additions enable the foam to solidify when warmed, or left to stand. When additions of this kind are not employed, the foam can be solidified by drying, since the extremely high stability of the foam produced in accordance with the invention allows drying to be effected without substantially inuring the foam structure.

The added oxygen-liberating substances may either be of liquid character, such as a solution of hydrogen peroxide or sodium perborate, or be in solid form, such as powdered $Na_2O_2$. In general, solid substances form coarser pores than those obtained by means of liquids. If desired both types of additions may be employed.

The minimum time that must be allowed to lapse for the development of the foam, after the addition of the oxygen-liberating substances, varies considerably according to the amount and character of said additions.

It may range between a fraction of a minute and several minutes—for example ½ to 5 minutes—being however, considerably longer in some instances.

Should it be desired to impart to the rubber dispersions the property of solidifying in jelly form by allowing them to stand in the cold, or by warming, the known additions for such purpose may be introduced, such as alkali silicofluorides, or zinc oxide in conjunction with ammonium salts. An addition of powdered ungelatinized starch has been found highly suitable for rendering the dispersion sensitive to heat. Another method of rendering the dispersions sensitive to heat, or imparting the faculty of solidifying on standing consists in adding formaldehyde in conjunction with the oxygen-liberating substances (such as hydrogen peroxide). In these circumstances, the formaldehyde becomes oxidized to formic acid, which coagulates the dispersion, or solidifies the foam.

The vesicular dispersions can be moulded in any known manner, such as by the use of pouring or dipping moulds, brushing or spraying. The masses are highly suitable, for example, for coating fabrics, such as for facing the under side of carpets with a layer of porous rubber. Spraying the dispersions on the foundations to be coated with the sponge rubber—a method that is highly suitable for many applications of the present invention—can be performed, for example, by adding the oxygen-liberating substances to the dispersion shortly before introducing the latter into the spraying pistol. They may also be added to the dispersion in the pistol itself.

The term "rubber dispersions" is to be understood as comprising all dispersions of rubber and like substances—such as guttapercha and balata—and dispersions of synthetic rubber. The natural dispersions, such as rubber latex, may be employed in their natural concentration or in the form of concentrates. The dispersions may be employed in a vulcanized condition, or may receive additions of vulcanizing agents if they are to be vulcanized later. All the dispersions may contain the usual additions, such as fillers, ageing media and coloring matters. In general, rubber dispersions with a content free of alkali hydroxide have proved of special advantage.

The vulcanization of the solidified mass can be performed in hot air, hot water or saturated steam. In both the latter instances the resulting porosity is greater than that obtained by the first named method, because the micropores resulting from the known Beckmann effect are produced in addition to the macropores due to the bubbles of oxygen.

*Example I*

|  | Parts |
|---|---|
| 40% ammonia latex | 200 |
| Zinc oxide | 10 |
| Sulphur | 3 |
| Vulcanizing accelerator (Vulkazit P extra) | 1 | are mixed together and around in a paint mill, whereupon 5 parts of a 40% solution of hydrogen peroxide are stirred in.

The mixture is then poured into a vessel of suitable shape and kept at 40° C. in a hot cupboard until a sponge of the desired size, or porosity, has formed from the mixture. It can then be taken out of the stove without loss of shape—even after being cooled—and is finally vulcanized, preferably in water.

As will be evident from this example, a sponge with smaller or larger pores can be produced, as desired, by varying the time accordingly.

*Example II*

|  | Parts |
|---|---|
| Rubber latex concentrate containing 75% dry substance known as "revertex" | 130 |
| Zinc oxide | 5 |
| Sulphur | 3 |
| Vulcanizing accelerator (Vulkazit P extra) | 1 |
| Ungelatinized starch | 8 |
| Colouring matter | 1 |
| Commercial hæmoglobin | 0.5 | are mixed together, and passed through a paint mill to obtain uniform distribution, whereupon 4 parts of a 15% solution of hydrogen peroxide are stirred in. The mixture, which assumes the condition of a fine foam in the course of a few minutes, is sprayed to a depth of about 2 mm., on the under side of a carpet, being then solidified by heating to about 100° C., for 5 minutes, dried and vulcanized in the open condition.

*Example III*

When a coating with coarser pores than in the case of Example II is desired, the following mixture may be employed instead:

|  | Parts |
|---|---|
| 73% revertex | 130 |
| Zinc oxide | 10 |
| Sulphur | 3 |
| Vulcanizing accelerator (Vulkazit P extra) | 1 |
| Ungelatinized starch | 10 |
| Colouring matter | 1 |
| Finely ground potassium peroxide | 1.5 |

The procedure is the same as set forth in Example II.

*Example IV*

In order to obtain a porous, leathery plate of hard rubber, the following procedure may be adopted. A mixture is prepared from:

|  | Parts |
|---|---|
| 73% revertex | 130 |
| Zinc oxide | 5 |
| Sulphur | 12 |
| Vulcanizing accelerator (Vulkazit DM) | 1 |

The mixture is ground in a paint mill and then treated with 3 parts of a 15% solution of hydrogen peroxide. After the foam has developed, and shortly before use, 2 parts of a 50% suspension of sodium silicofluoride are stirred in. The mass is then poured into a plate mould and left to solidify therein, being finally vulcanized in steam.

*Example V*

A porous hard-rubber plate can be produced in the following manner:

A mixture is prepared from:—

|  | Parts |
|---|---|
| 73% revertex | 130 |
| Zinc oxide | 5 |
| Sulphur | 30 |
| Vulcanizing accelerator (Vulkazit D) | 2 | and after treatment in the paint mill, is treated with 5 parts of a 15% solution of hydrogen peroxide. When the foam has developed, the mixture is poured into a plate mould in which it is dried at 80–100° C., and is finally vulcanized.

*Example VI*

To produce a ball consisting entirely of sponge rubber throughout a mixture is prepared from:

|  | Parts |
|---|---|
| 73% revertex | 130 |
| Zinc oxide | 10 |
| Sulphur | 3 |
| Vulcanizing accelerator (Thiuram) | 1 |
| 36% solution of ammonium nitrate or acetate | 10 |

After being homogenized in a paint mill, the mixture is treated with 3 parts of a 15% solution of hydrogen peroxide and, after the foam has developed, is poured into a spherical iron mould composed of two hemispheres, one of which is provided with a closable pouring orifice. After said orifice has been closed, the mould is heated to a temperature below 100° C.—such as 40–90° C.—until the spongy mass has solidified. Vulcanization can be performed, preferably in water, after the ball has been taken out of the mould.

*Example VII*

A toilet sponge can be made in the following manner:

A mixture of:—

|  | Kgs. |
|---|---|
| Revertex | 130 |
| ZnO | 10 |
| Sulphur | 3 |
| Vulcanizing accelerator (Vulkazit P extra) | 1 | is ground in the paint mill, 5 litres of a 40% solution of formalin and 5 litres of a 15% solution of hydrogen peroxide being then added. The mixture is poured into a number of hemispherical cups of proper size for a sponge, and is heated for about half an hour at 90° C. in a drying cupboard. At the end of that time, the mass will have attained the condition of sponge and solidified as such. It is then taken out of the cups and vulcanized for about half an hour, floating in boiling water.

In pouring the foamy mass into the spherical mould, there is no need to fill the latter completely. Measuring the quantity of the said mass provides a means for controlling the size of the pores, inasmuch as the pores become larger the smaller the amount of mass introduced into the mould.

As a rule, the sponge rubber articles produced by the process of the present invention have an outer skin that is less porous than the interior of the article and, in some cases, is even practically solid. In the event of it being desired to produce a surface corresponding, in porosity, with the interior of the article, a film of rubber closing the pores of the outer surface can be removed with the aid of the sand-blast or by grinding, or the said outer portion can be cut off. The formation of a compact outer surface may, however, also be prevented by allowing the foam to solidify not against dense (e. g. metallic) surfaces or exposed surfaces, but against the walls of moulds lined with a preferably damp layer of a fabric or of paper.

The process of the present invention offers a series of substantial advantages. By measuring out the added substances that liberate oxygen, the porosity of the products can be satisfactorily controlled in a repeatedly obtainable manner. By comparison with the processes based on the action of ammonium salts for the production of sponge rubber, it ensures the advantage that the work can be performed at lower temperatures, for example even at room temperature. On the other hand, ammonium salts, such as the carbonate or nitrite, only dissociate to a sufficient extent at temperatures above 100° C. The method in which bubbles of carbon dioxide are liberated in the dispersion by the action of acids on carbonates in the warm, is attended with many defects. The acid acts as a coagulant on the rubber dispersion and, moreover, owing to the impossibility of distributing the acid rapidly enough during the mixing operation, excessive local inflation occurs, and the foam generated in the warm collapses in cooling. Furthermore, the acid has an adverse influence on the vulcanization and the character of the products. In general, it may be said that the higher the temperature at which the foam is generated, the greater is its tendency to shrink, and, in some cases, to collapse entirely in cooling. When the foam is generated at high temperatures it is therefore necessary for the action of the gas and the vulcanization to proceed in a single working stage and, unless closed moulds are employed to be carefully harmonized—a condition which experience has shown to be difficult to fulfil in practice. In the case of the present process, such difficulties can be entirely avoided, and, in addition, the process is distinguished by not requiring any expensive apparatus.

I claim:
1. Process for the production of sponge rubber articles from liquid aqueous rubber dispersions which consists in adding to the dispersion an agent capable of evolving active oxygen without thickening the dispersion, converting the dispersion into a foam through evolution of oxygen bubbles and solidifying the foam.

2. Process for the production of sponge rubber articles from liquid aqueous rubber dispersions which consists in adding to the dispersion hydrogen peroxide, converting the dispersion into a foam through evolution of oxygen bubbles and solidifying the foam.

3. Process for the production of sponge rubber articles from liquid aqueous rubber dispersions which consists in adding to the dispersion an agent capable of evolving active oxygen without thickening the dispersion and a catalyzer controlling the evolution of oxygen, converting the dispersion into a foam through evolution of oxygen bubbles and solidifying the foam.

4. Process for the production of sponge rubber articles from liquid aqueous rubber dispersions which consists in adding to the dispersion an agent capable of evolving active oxygen without thickening the dispersion, heating the dispersion to cause the agent to evolve oxygen bubbles and convert the dispersion into a foam, and solidifying the foam.

5. Process for the production of sponge rubber articles from liquid aqueous rubber dispersions which consists in adding to the dispersion an agent capable of evolving active oxygen without thickening the dispersion and at least one substance imparting to the rubber dispersion the property of solidifying to jelly on being warmed, converting the dispersion into a foam through evolution of oxygen bubbles and solidifying the foam.

6. Process for the production of sponge rubber articles from liquid aqueous rubber dispersions which consists in adding to the dispersion an agent capable of evolving active oxygen without thickening the dispersion, converting the dispersion into a foam through evolution of oxygen bubbles, adding alkali metal silico fluoride and solidifying the foam.

HANS WOLF.